United States Patent [19]

Steffan et al.

[11] Patent Number: 4,615,722
[45] Date of Patent: Oct. 7, 1986

[54] VALVE BLOCK TEST APPARATUS

[75] Inventors: Leonard D. Steffan, Perrysburg; Wilbur L. McCoy, Toledo, both of Ohio

[73] Assignee: Owens-Illinois, Inc., Toledo, Ohio

[21] Appl. No.: 778,105

[22] Filed: Sep. 20, 1985

[51] Int. Cl.[4] .............................................. C03B 9/40
[52] U.S. Cl. ......................................... 65/158; 65/29; 65/DIG. 13; 73/4 R; 137/559
[58] Field of Search .................... 65/29, 158, DIG. 13; 137/559; 73/4 R

[56] References Cited

U.S. PATENT DOCUMENTS

| 2,818,726 | 1/1958 | Amonette et al. | 73/4 R |
| 3,587,290 | 6/1971 | Beauchamp et al. | 73/4 R |
| 4,102,175 | 7/1978 | Foster | 73/4 R |
| 4,512,179 | 4/1985 | Umble et al. | 73/4 R |

FOREIGN PATENT DOCUMENTS 0055835 4/1983 Japan .................................. 73/4 R Primary Examiner—Arthur Kellogg
Attorney, Agent, or Firm—John R. Nelson

[57] ABSTRACT

A test apparatus for measuring activation and deactivation times of solenoid-operated pilot and air-operated cartridge valves in a valve block assembly for an air-operated IS glassware-forming machine. The test apparatus includes pressure transducers for selective individual connection to the outputs of the solenoid and cartridge valves of a valve block assembly, and an array of electrical switches for selectively energizing the solenoid of a solenoid valve to be tested. A first pair of counters measure activation and de-activation times of the solenoid valve under test, and a second pair of counters measure activation and de-activation times of a solenoid/cartridge valve combination under test. The measured times are displayed in milliseconds at associated numeric displays. A flow meter is connected to the exhaust port of a cartridge valve under test for measuring leakage of air past the seals and seats of the cartridge valve.

8 Claims, 10 Drawing Figures

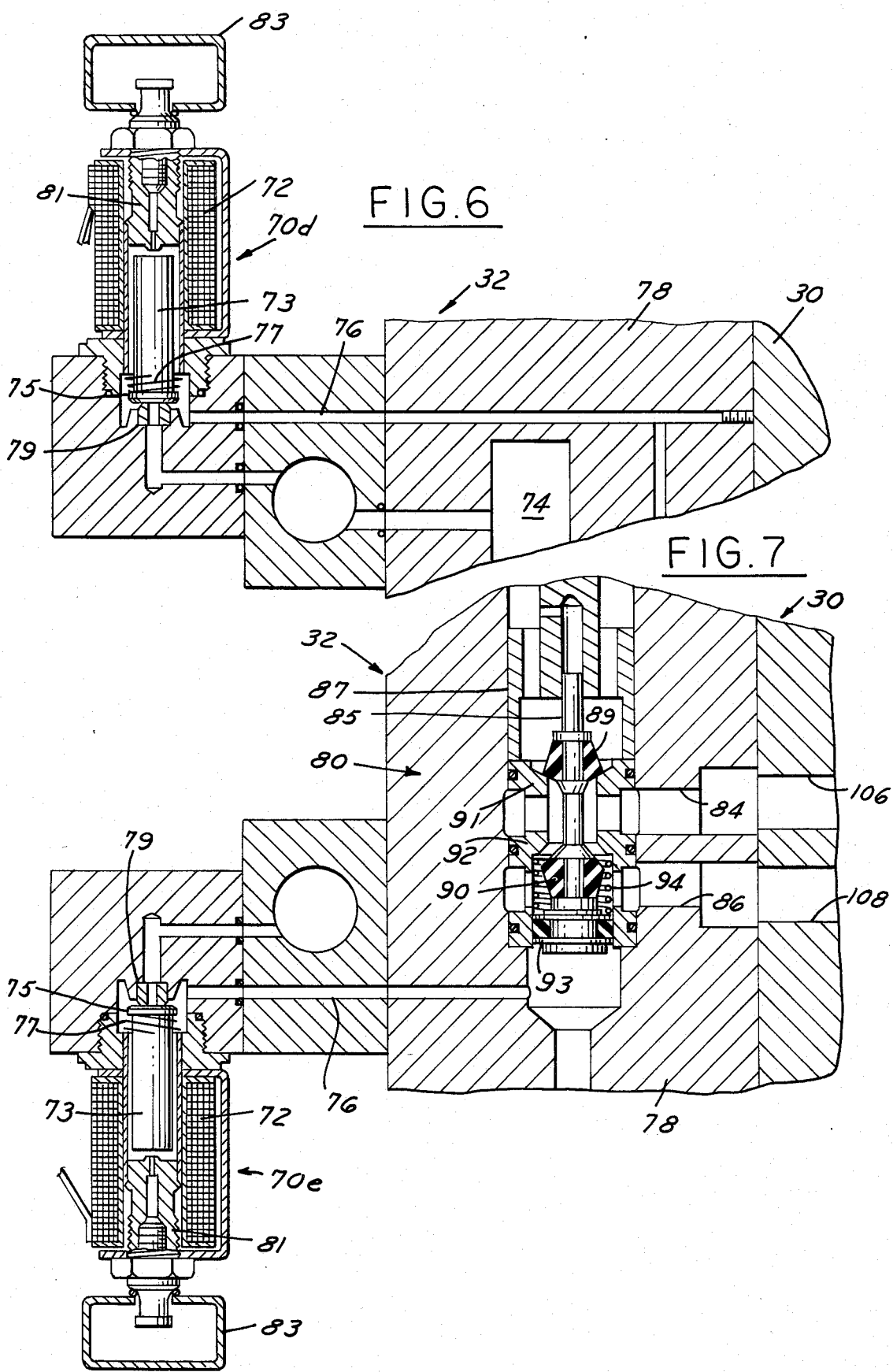

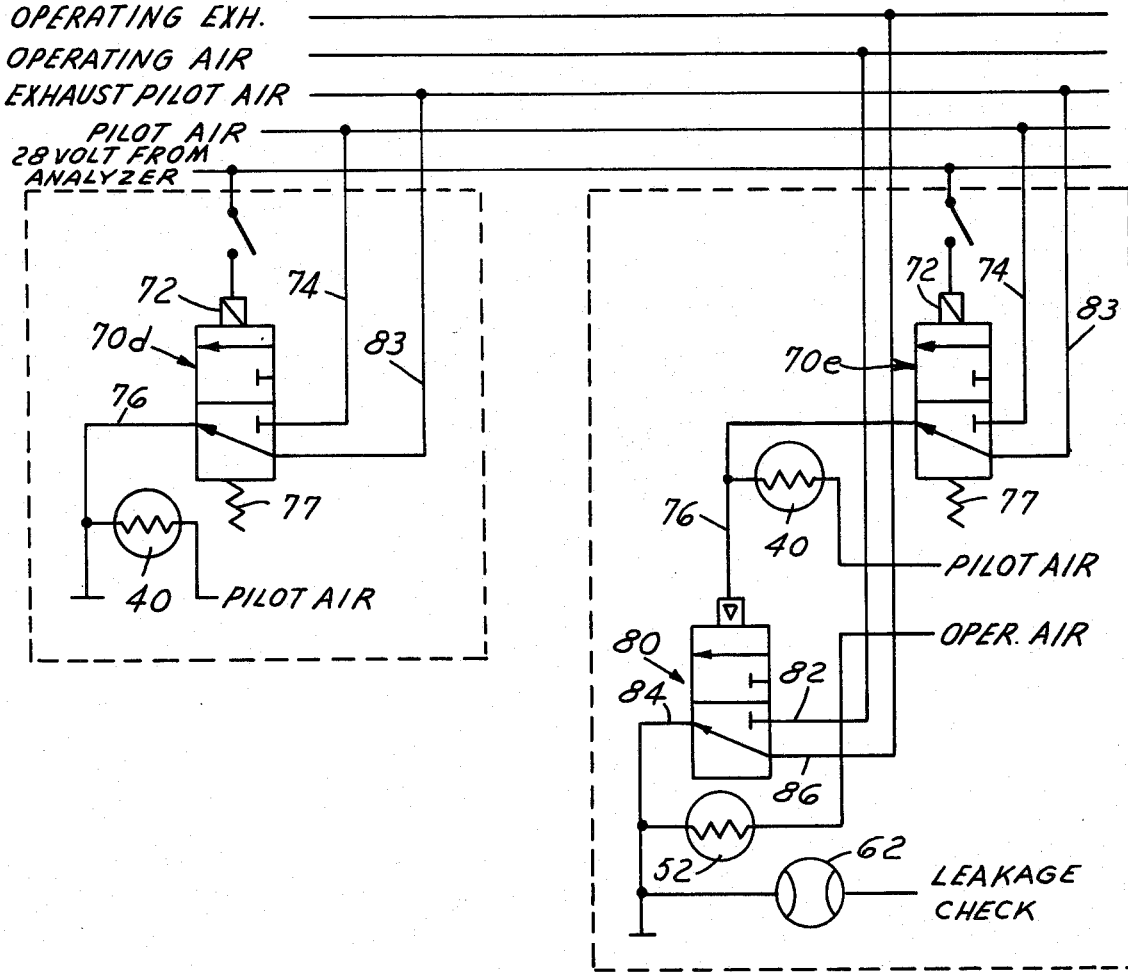

VALVE BLOCK TEST APPARATUS

The present invention is directed to manufacture of glassware such as containers in air-operated individual section or IS machines, and more particularly to apparatus for testing operation of individual valves in a valve block assembly which controls operation of the various mechanisms in an individual section of an IS machine.

BACKGROUND OF THE INVENTION

Conventional individual section or IS glassware forming machines comprise one or more sections, each of which is supplied with one more more gobs of molten glass. These gobs are formed into containers or other glassware in each section of the forming machine by transfer mechanisms and molds which are primarily pneumatically operated. Each part of the manipulative mechanism of a section carries out a separate step in the formation of finished ware and is controlled by operation of a pneumatic valve. Initially, the various operating valves were controlled with respect to each other by adjustable cams carried on a rotatable timing drum common to all cams and valves. See U.S. Pat. No. 1,911,119. More recently, it has become desirable to implement electronic control of the operating valves of each machine section. U.S. Pat. Nos. 3,918,489 and 4,100,937 disclose valve block assemblies which include a plurality of air-operated poppet or cartridge valves for controlling operation of associated mechanisms of an IS machine section, and a corresponding plurality of electrically-operated solenoid pilot valves for controlling operation of associated poppet valves. The solenoid and poppet valves for each section of an IS machine are mounted in a common valve block assembly and share manifold and exhaust lines. An electrical connector on the valve block assembly enables connection to an external electronic control device, such as a programmable controller or control computer. The valve block assembly may be readily removed from a forming machine section for repair and replacement by another like assembly, and thereby minimize downtime of the forming machine.

When placing a valve block assembly in operation in an IS machine, it is desirable to possess accurate information concerning operating characteristics of the various valve mechanisms in the valve block assembly with respect to each other so that motion at the IS machine may be closely controlled. Wear at the seals, spools and springs of the various valves increase operating delays. However, variations in operating characteristics may be accommodated within a fairly wide range by corresponding variations in the control programming, as long as such operating characteristic variations can be readily determined. It is therefore important to test operation of the various valves in situ on the valve block as it is to be employed in the IS machine so that wear and tolerance variations can be determined and accommodated.

OBJECTS AND SUMMARY OF THE INVENTION

It is therefore a general object of the present invention to provide apparatus for qualitatively testing operating characteristics of individual valves of a valve block assembly under operating conditions—i.e. with the valve block fully assembled and connected to sources of compressed air at normal operating pressures.

It is a more specific object of the invention to provide test apparatus of the described character in which operating times of the individual valves during both activation and deactivation are displayed to a test technician to facilitate incorporation of such information into control programming of an IS machine.

Yet another object of the invention is to provide test apparatus of the described character which includes facility for measuring air leakage at the valves during deactivation, and thereby identifying valves whose seals or seats may require replacement.

In accordance with the present invention, measurement electronics are connected to the solenoid valve connector of a valve block assembly under test, and include a plurality of switches for individually and selectively operating associated solenoids of the valve block assembly. A first air pressure transducer is constructed for selective individual connection to the output of each solenoid valve to provide a signal indicative of valve output pressure. Threshold detectors in the test electronics are responsive to the transducer output signal to detect energization and de-energization at the valve to which the transducer is connected. A first pair of counters are responsive to the operating switches and to the threshold detectors for measuring energization and de-energization delay times at the valve under test, and indicate such delay times in milliseconds at a corresponding pair of digital displays.

Where the output of the solenoid valve under test is connected within the valve block assembly to an associated air-operated poppet or cartridge valve, the test apparatus includes facility for measuring operating delay at the cartridge valve. More specifically, a second air pressure transducer is constructed for selective individual connection to the output of each cartridge valve and provides an electrical signal indicative of valve output pressure. A second set of threshold detectors receive such transducer output to determine energization and de-energization at the cartridge valve. A second pair of counters are responsive to the solenoid valve operating switches and to the second set of threshold detectors for measuring delay times between electrical signals to the solenoid valve and energization or de-energization at the cartridge valve. These counters are connected to associated numerical displays for indicating such delay times in milliseconds to a test technician. The delay times associated with each solenoid valve, or with each solenoid/cartridge valve combination, may be noted and accommodated in control programming for the section of the IS machine in which the tested valve block assembly is to be connected so as to obtain desired motions at the operating mechanisms of the IS machine section.

In the preferred embodiment of the invention herein disclosed, the test apparatus also includes a test stand having a manifold block which simulates the "kiss block" of the IS machine on which the valve block assembly is to be mounted. The manifold block includes facility for simultaneously supplying air at operating pressures to all solenoid-operated and air-operated valves of the valve block assembly mounted thereon. An air flow meter is constructed for selective individual connection to the exhaust port of the various air-operated cartridge valves through the fixture manifold block for measuring air leakage at such exhaust port, and thereby providing an indication of operating conditions at the associated valve seals and seats.

BRIEF DESCRIPTION OF THE DRAWINGS

The invention, together with additional objects, features and advantages thereof, will be best understood from the following description, the appended claims and the accompanying drawings in which:

FIG. 6 is a fragmentary sectional view on an enlarged scale of a solenoid-operated valve in a valve block assembly under test;

FIG. 7 is a fragmentary sectional view on an enlarged scale of a solenoid-operated valve and air-operated cartridge valve combination in a valve block assembly under test;

FIG. 8 is a schematic illustration of the valves of FIGS. 6 and 7 connected to the test apparatus of the invention.

DETAILED DESCRIPTION OF PREFERRED EMBODIMENT

Figure 1:
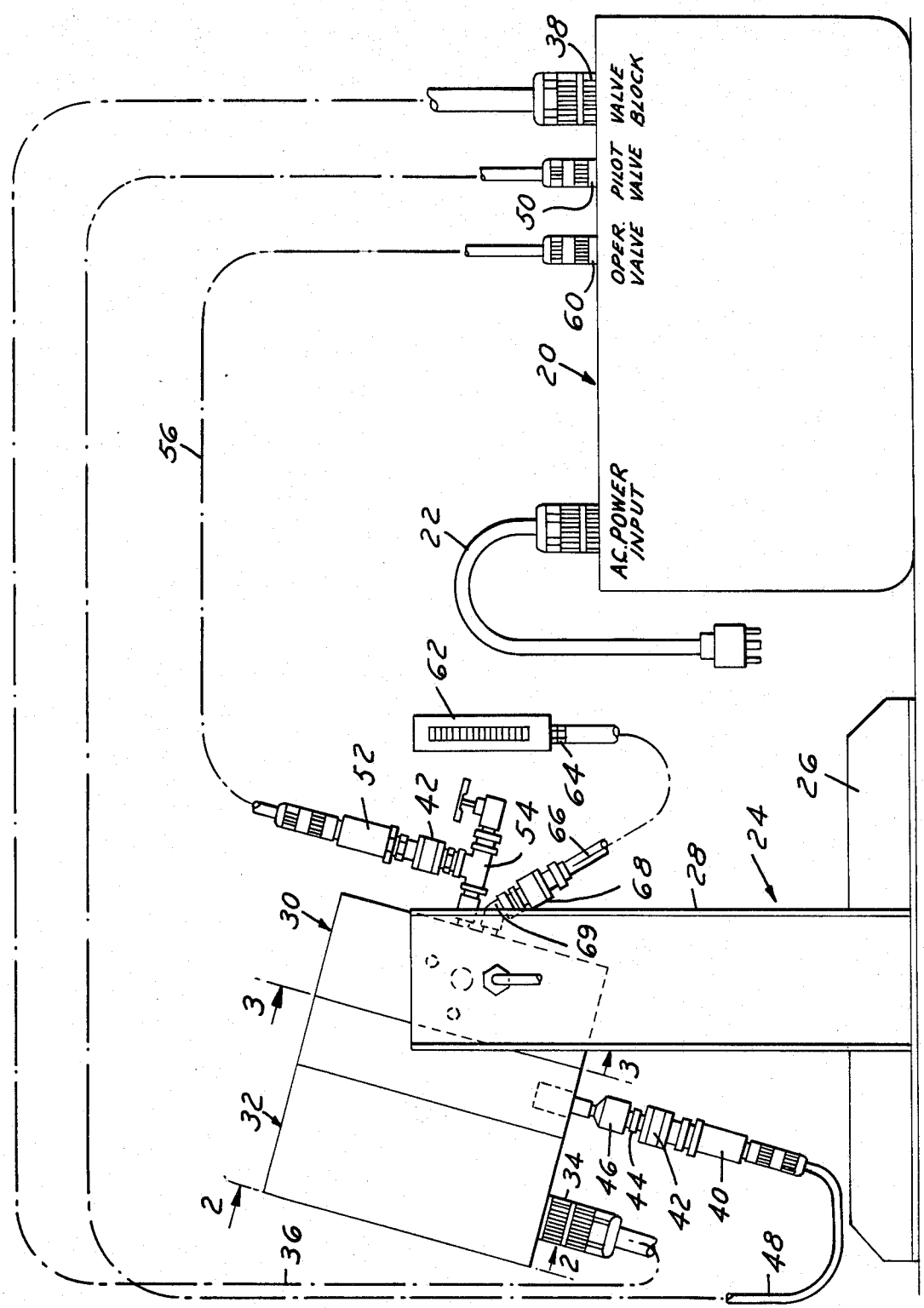
FIG. 1 is an elevational view of apparatus in accordance with the invention for testing operation of a valve block assembly having a valve block assembly mounted and connected thereto.
Figure 2:
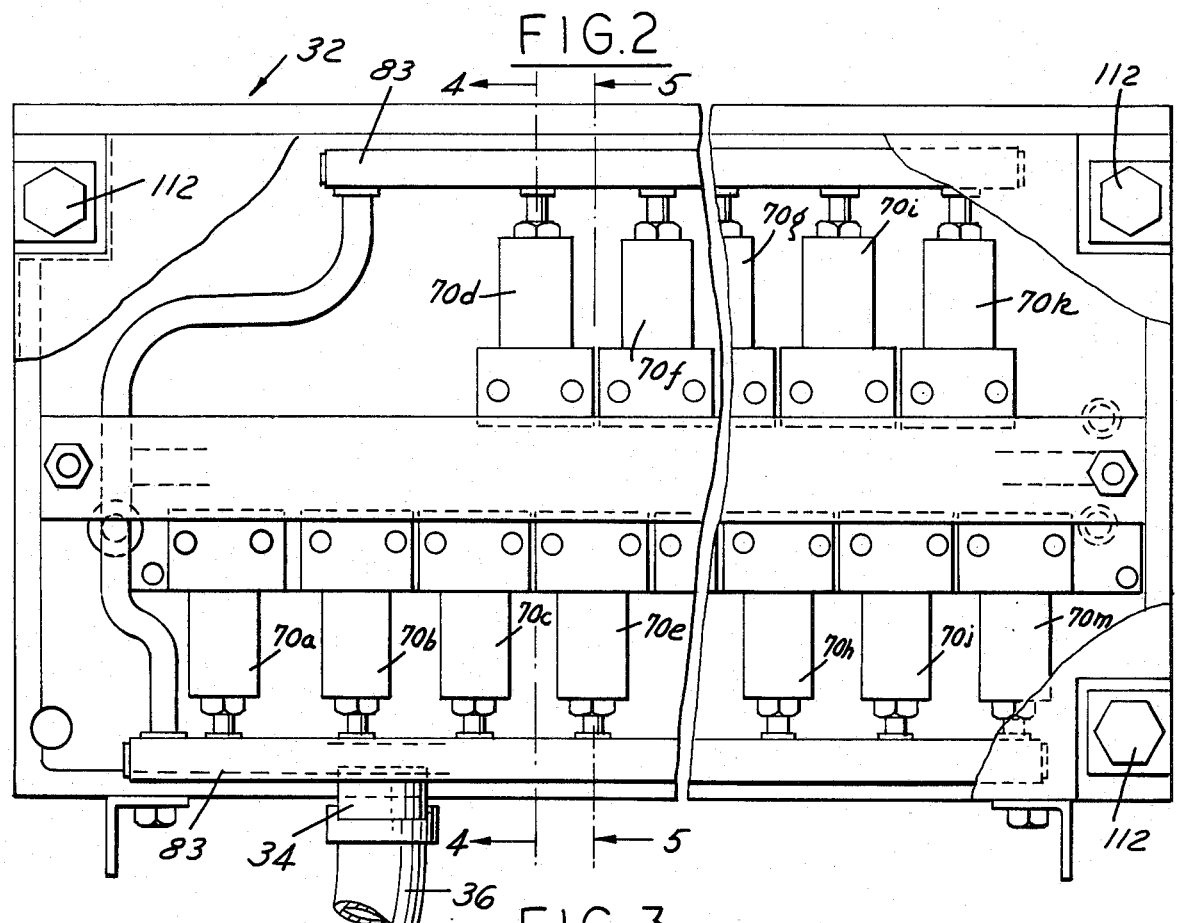
FIGS. 2 and 3 are fragmentary sectional views taken along the respective lines 2—2 and 3—3 in FIG. 1.

FIG. 1 illustrates the various elements of test apparatus in accordance with the invention as comprising an enclosure 20 which houses the test electronics (FIG. 9a and 9b) having a power cable 22 for connection to a source of electrical utility power. A test stand 24 includes a base 26 on which are mounted a pair of upstanding brackets 28. A test block 30 is pivotally suspended between brackets 28. As illustrated in FIG. 1, a valve block assembly 32 is mounted on test block 30. An electrical connector 34 on valve block assembly 32, which has contacts individually electrically connected to the various solenoids of assembly 32, is connected by a mating cable 36 to an identical connector 38 on enclosure 20. An air pressure transducer 40 is connected by a coupler 42, a nipple 44 and an adapter 46 to the output of a solenoid-operated pilot valve under test, and by a cable 48 to a connector 50 on enclosure 20. (As employed in the text and drawings of the present application, the term "pilot valve" refers to an electrically-operated solenoid valve, while the term "operating valve" refers to an air-operated cartridge or poppet valve.) A second air pressure transducer 52 is connected by a coupler 42 and a fitting 54 to the output of an air-operated cartridge valve under test, and by an electrical cable 56 to a connector 60 on enclosure 20. An air flowmeter 62 is connected by an adapter 64, a hose 66, a hose coupler 68 and a fitting 69 to the exhaust port of the air-operated cartridge valve under test. The manner of connecting transducers 40, 52 and flowmeter 62 to the valves under test will be described in greater detail hereinafter.

Figure 4:
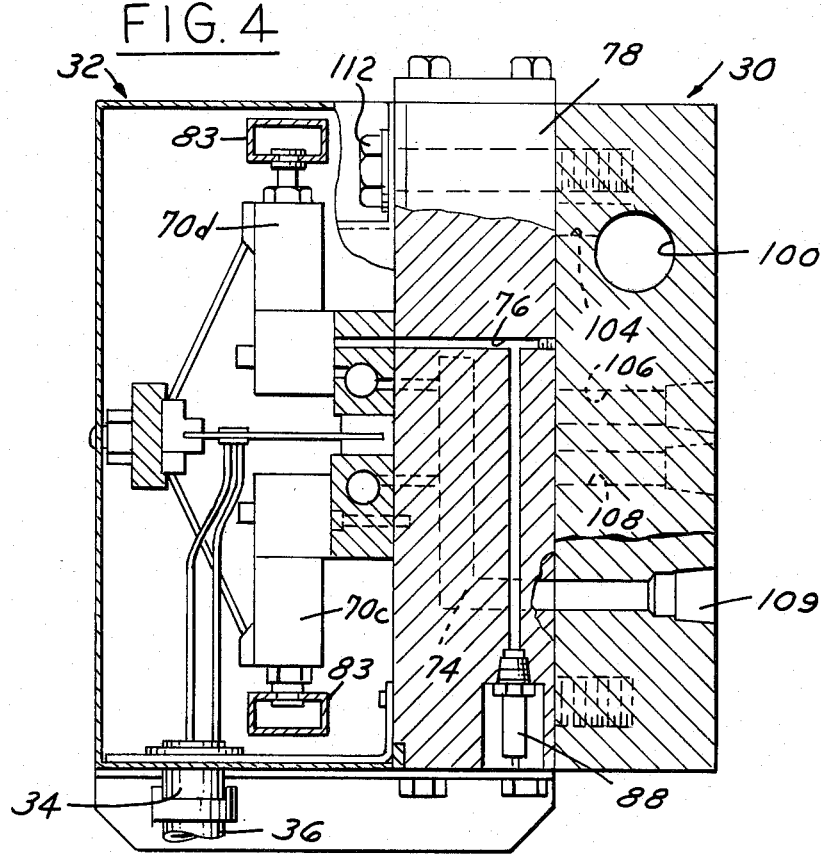
FIGS. 4 and 5 are sectional views taken along the respective lines 4—4 and 5—5 in FIG. 2.

FIGS. 2 and 4–7 illustrate the structure of valve block assembly 32 which, although of generally conventional design and similar in many important respects to that illustrated in above-noted U.S. Pat. No. 4,100,937 (the disclosure of which is incorporated herein by reference), will be described briefly to facilitate understanding of construction and operation of the test apparatus in accordance with the invention. Valve block assembly 32 includes a plurality of, preferably twenty-one, electrically-operated solenoid pilot valves 70a–70m positioned in spaced oppositely oriented arrays. As best seen in FIGS. 4, 6 and 7, each solenoid valve includes an electrical solenoid 72 having one lead connected in common with all other solenoids 72 to connector 34 and another lead connected to an individual contact of connector 34. A plunger 73 is slidably positioned within solenoid 72 and has a head 75 normally biased by a coil spring 77 against a seat 79. The input air to each solenoid pilot valve is supplied by a common manifold passage 74, and output air from each pilot valve is provided along an individual passage 76 extending from seat 79. A second seat 81 is normally spaced from plunger 73 and has a central passage to an exhaust manifold 83. In the normal or deenergized state illustrated in FIG. 6, input air from passage 74 is blocked by plunger head 75 spring-biased against seat 79, and output passage 76 is connected to exhaust manifold 83 around plunger 73 and through seat 81. When solenoid 72 is energized, plunger 73 is drawn against seat 81 to block such exhaust and to connect input air manifold passage 74 to output passage 76. All pilot valves 70a–70m are identical.

A number of the solenoid valves, such as valve 70d illustrated in FIGS. 4 and 6, have output passages 76 fed directly to the flat rear surface of valve block 78 for direct operating connection to associated mechanisms in the IS machine. On the other hand, a number of the solenoid pilot valves, such as valve 70e illustrated in FIGS. 5 and 7, have output passages 76 connected as inputs to associated air-operated cartridge valves 80 mounted in spaced positions along valve block 78. Each such cartridge valve 80 has a poppet 85 slidably disposed within cartridge shell 87. Poppet 85 has a pair of spaced heads 89,90 which cooperate with spaced seats 91,92 on shell 87. A pressure head 93 on poppet 85 slidingly seals against the opposing shell wall and captures a spring 94 which normally biases head 89 against seat 91 while spacing head 90 from seat 92. A first port 82 is positioned above head 89 and seat 91 (FIG. 5) for receiving input air under pressure. A second port 84 opens between seats 91,92 for connecting such input air to an associated IS machine mechanism when valve 80 is actuated. An exhaust port 86 opens between seat 92 and head 93 for connecting port 84 to exhaust when the associated valve 80 is de-actuated (as shown in the drawings). All of the ports 82,84,86 open at the planara rear surface of the valve block 78 for communication with the "kiss block" of the IS machine. A plurality of test fittings 88 are mounted along the lower edge of valve block 78 and are each individually connected to an associated pilot valve output passage 76 for testing operation of the associated pilot valve.

In general, and referring also to the schematic illustration of FIG. 8, each solenoid-operated pilot valve 70a–70m is normally closed, with the valve output passages 76 being connected to exhaust. When the solenoid 72 of a pilot valve is energized by a corresponding electrical signal at connector 34, such exhaust is blocked and communication is opened between manifold 74 and output passage 76, thus supplying air under pressure at such output passage. In like manner, the poppet 85 of each valve 80 is normally biased by spring 94 to block communication between associated input port 82 and output port 84, and to connect such output port to exhaust port 86. When air under pressure is supplied at pilot valve output passage 76 in FIG. 7, the valve poppet is urged upwardly against the force of spring 94, so that upper head 89 is lifted from its associated seat 91 to open communication between supply air port 82 and output port 84. At the same time, lower head 90 is urged into engagement with its associated seat 92 to block output port 84 from exhaust port 86. Seal 93 blocks pilot air under pressure from exhaust port 86. Thus, energization of the solenoid of a pilot valve either supplies pilot air under pressure to the rear face of valve block 78 or actuates an associated cartridge valve for supplying operating air under pressure to the rear valve block face. When the pilot valve solenoid is de-energized, the respective valves return to their normal positions in which the outputs are connected to exhaust.

Figure 3:
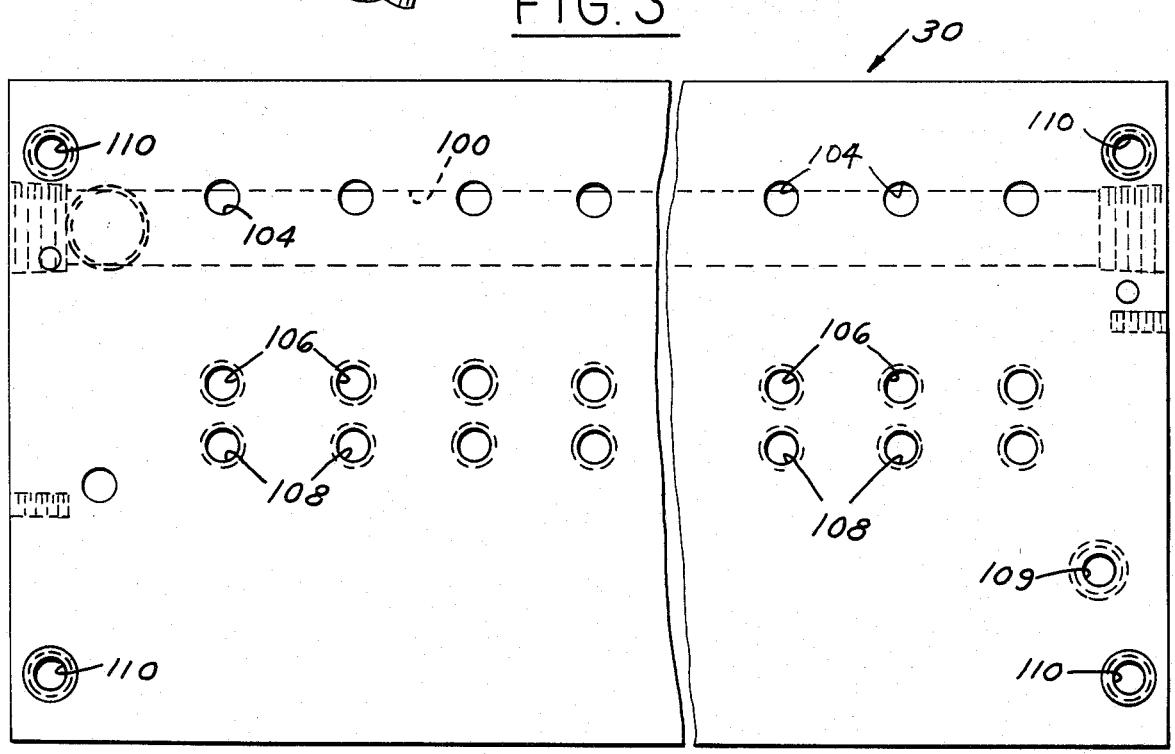
Figure 5:
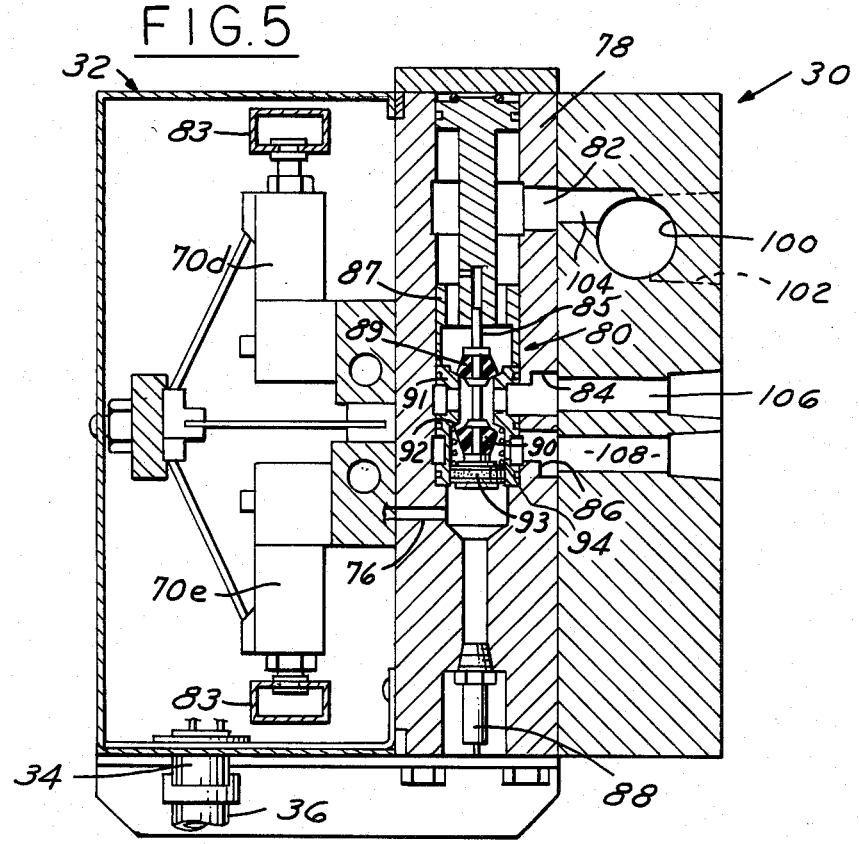

Turning now to FIGS. 3-5, block 30 of test stand 24 has a planar front surface for facing engagement with the rear surface of valve block 78. A through passage 100, which extends lengthwise along block 30, has an input port opening at the rearward surface of block 30 for connection (not shown) to a source of air under pressure. A plurality of openings 104 extend from passage 100 to the front face of block 30 at positions for alignment with supply ports 82 of cartridge valves 80 in a valve block assembly 32 mounted thereon. Through passage 100 is blocked at both ends. Two parallel arrays of passages 106,108 extend through block 30 from the front to rear surfaces thereof and are positioned for respective alignment with output ports 84 and exhaust ports 86 of a valve block assembly 32 mounted on test block 30. Threaded openings 110 in the front surface of block 30 accommodate bolts 112 for securely mounting valve block assembly 32 to test block 30. Each of the passages 106,108 is flared at the rear surface of test block 30 for receiving fittings 54,69 (FIG. 1). Adapter 46 (FIG. 1) is constructed to be movably received over pilot valve test fittings 88. It will be noted in FIGS. 4 and 6 that pilot valve output passages 76 of solenoid valves 70d,70f,70g, 70i and 70k, which have no cartridge valves 80 associated therewith, are blocked by test block 30 at the back face of valve block 78. A passage 109 (FIG. 4) in test block 30 provides for connection (not shown) of a source of air under pressure to pilot air manifold passage 74.

Figure 9A:
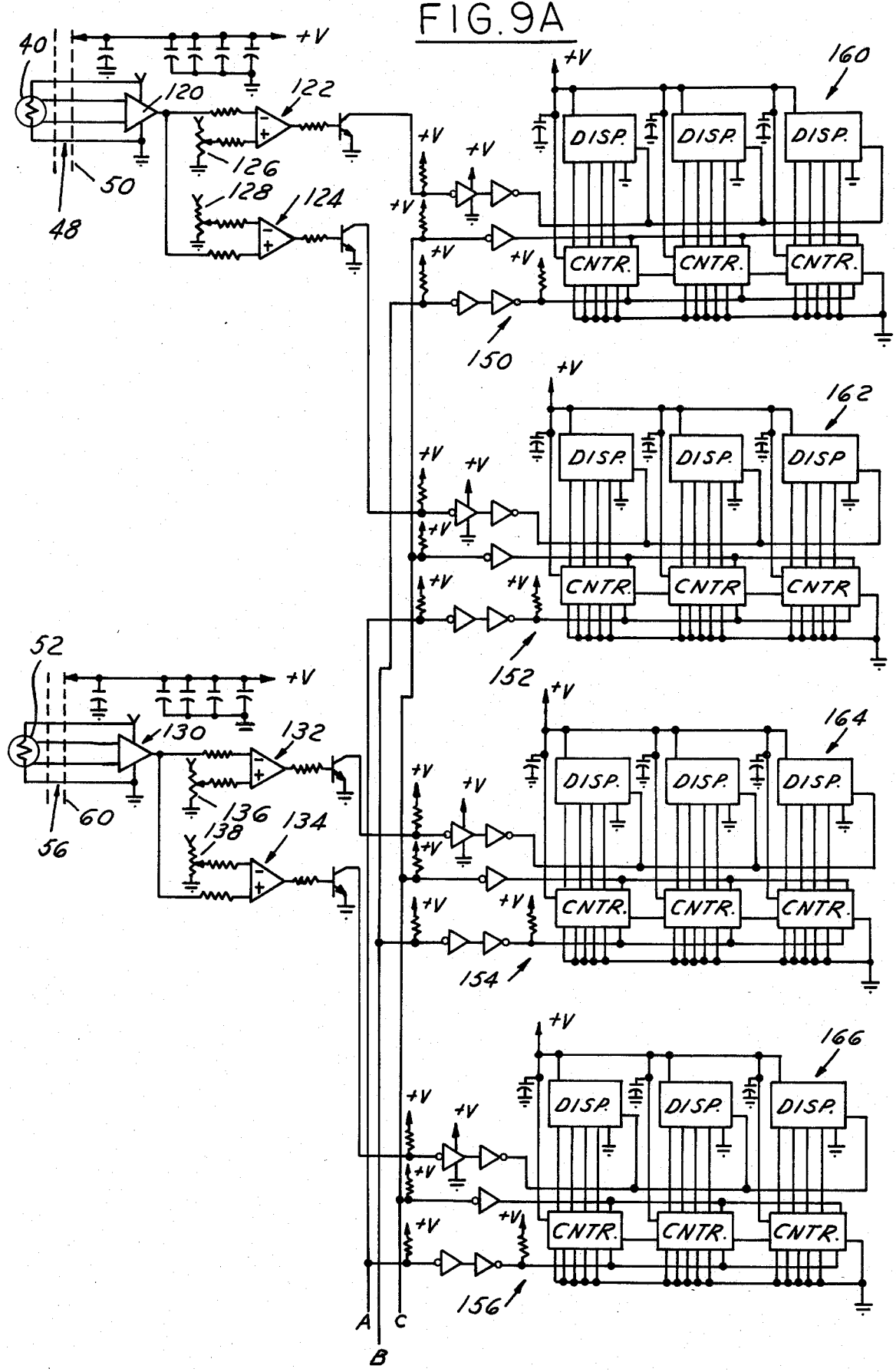
FIGS. 9A and 9B are an electrical schematic drawing of the test apparatus electronics in accordance with a presently preferred embodiment of the invention.
Figure 9B:
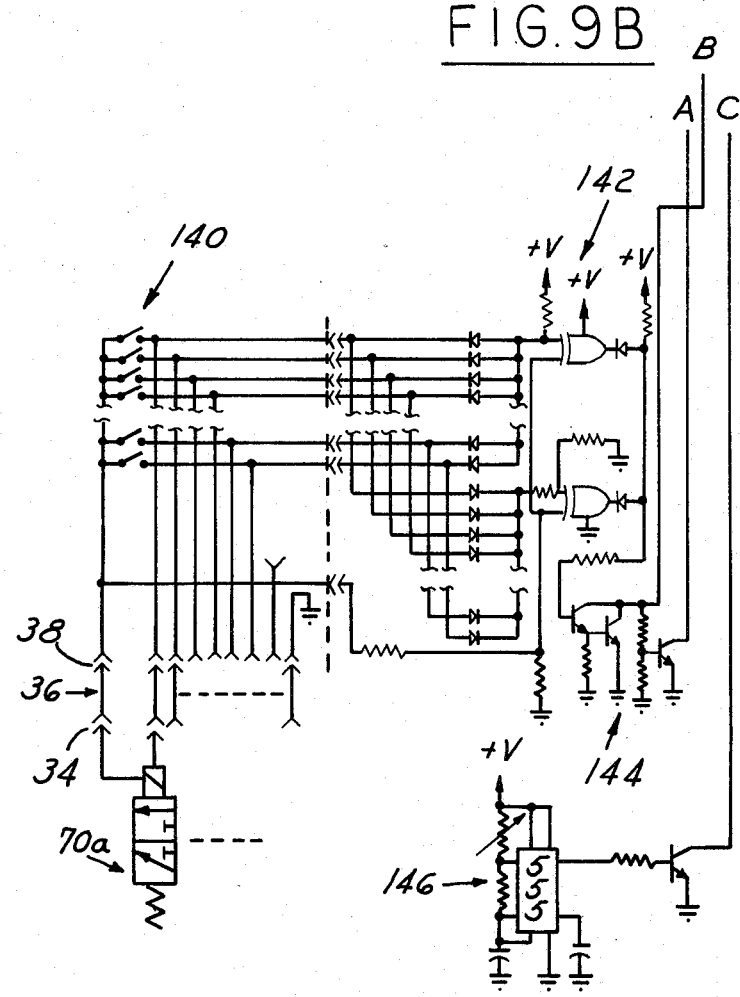

FIGS. 9A and 9B illustrate the test apparatus electronics as including an input amplifier 120 which receives the electrical output of transducer 40 by means of cable 48 and connector 50. The output of amplifier 120 is connected to a pair of threshold detectors 122,124. Threshold detector 122 includes a differential amplifier having an inverting input connected to the output of amplifier 120 and a non-inverting input connected to a variable resistor 126 for providing an adjustable threshold reference to detector 122. Similarly, detector 124 includes a differential amplifier having a non-inverting input connected to the output of amplifier 120 and an inverting input connected to a variable resistor 128 for providing an adjustable detector threshold. Thus, detector 122 provides an output signal when the pressure at transducer 40 exceeds the threshold set by resistor 126, and detector 124 provides a similar output when the pressure at transducer 40 decreases below the threshold set by resistor 128. An input amplifier 130 receives the electrical output of pressure transducer 52 by means of cable 56 and connector 60, and provides an output to a pair of threshold detectors 132,134. Detectors 132,134 are respectively identical to detectors 122,124 hereinabove described in detail, and receive corresponding adjustable threshold references from variable resistors 136,138. Detector 132 thus provides an output signal indicative of activation of a cartridge valve to which transducer 52 is connected, while detector 134 provides a corresponding signal indicative of de-activation of such cartridge valve.

A bank of normally-open toggle switches 140 (FIG. 9B) are individually connected to associated contacts of connector 38 (FIGS. 1 and 9B), and thus by cable 36 and connector 34 to associated solenoids of pilot valves 70. Switches 140 are connected through an EXCLUSIVE-OR gating network 142 and through a series of transistor switches 144 to provide a first signal on bus B when one of the switches 40 is initially closed, and a second signal on bus A when that switch 140 is thereafter released and reopened. An adjustable frequency oscillator 146 provides a pulsed periodic time-base signal on bus C for measuring operating time characteristics at the valve block under test. Returning to FIG. 9A, four counters 150,152,154, and 156 receive respective clock inputs from signal bus C. The enable inputs of counters 150,154 are connected to signal bus B, while the enable inputs of counters 152,156 are connected to signal bus A. Each counter 150-156 has an output connected to an associated register/digital display 160,162,164 and 166. The load-command input to register/display 160 is connected to threshold detector 122, and the load-command inputs to register/displays 162,164 and 166 are connected to threshold detectors 124,132 and 134 respectively.

To test operating characteristics of a valve block assembly 32, the assembly is first mounted on block 30 of test stand 24 (FIG. 1) and input air is supplied to the valve block assembly through test block openings 102 (FIGS. 3 and 5) and 109 (FIGS. 3 and 4). Cable 36 (FIGS. 1 and 9B) is then connected to valve block connector 34 so as to connect switches 140 to individual valve solenoids. Pilot valve adapter 46 is connected to a selected test fitting. If the selected pilot valve has an associated cartridge valve, fitting 54 is connected to the associated test block passage 106, and flow meter fitting 69 is connected to the associated test block passage 108. The selected pilot valve or pilot/cartridge valve combination is then ready for test. It will be appreciated that adapter 46 and fittings 54,69 must be repositioned for testing of each successive pilot valve or pilot cartridge valve combination.

With all connectors and fittings so positioned, and with electrical power applied, the switch 140 associated with the solenoid/pilot valve selected for test is closed by the test technician. Counter 150 is enabled upon closure of the switch 140, and thereafter counts upwardly as a function of the clock input thereto from oscillator 146. When the pressure sensed at transducer 40 exceeds the threshold set by resistor 126, the resulting signal from detector 122 loads the output of counter 150 at that instant into register/display 160, which thus provides a digital display of the time, preferably in milliseconds, between switch activation and the threshold pressure at transducer 40. This time is a measure of the activation delay time of the solenoid-operated pilot valve under test. Closure of selected switch 140 also enables operation of counter 154, which likewise begins to count upwardly. When the pressure at transducer 52 exceeds the threshold set by resistor 136, the resulting signal from threshold detector 132 loads the counter output into register/display 164. Display 164 thus provides a numeric indication, preferably in milliseconds, of the time between closure of switch 140 and detection of the threshold pressure at transducer 52, and thus provides an indication of operating characteristics of the pilot/cartridge valve combination to which transducer 52 is connected during activation.

Subsequent opening of the switch 140 enables operation of counters 152 and 156, each of which thereafter begins to count upwardly as a function of the clock signal from oscillator 146. The respective counter outputs are loaded into register/displays 162,166 when threshold detectors 124,134 detect decrease of pressures at transducers 40,52 below the thresholds set by resistors 128,138. Displays 162,166 thus provide numeric indications, preferably in milliseconds, of de-activation times at the solenoid value and of the solenoid/cartridge valve combination respectively. Such activation and de-activation times at displays 160-166 may be recorded by the technician for accommodation in the IS machine control programming when the tested valve block assembly is mounted thereto. Adapter 46 and fittings 54,69 are then moved to the next pilot or pilot/cartridge valve combination, and the test is repeated.

Flowmeter 62, which is connected to cartridge valve exhaust port 86, measures leakage past sealing head 93 (FIG. 7) and seat 91 or 92, and thus indicates if cartridge valve repair is necessary.

The invention claimed is:

1. Apparatus for testing a valve block assembly for operating an individual section glass forming machine, said valve block assembly including a plurality of solenoid-operated air valves, a manifold including means for supplying input air under pressure to all of said valves and means for individual connection to the output of each said valve, and first electrical connection means individually connected to solenoids of said valves for operating said valves, said apparatus being constructed for individual qualitative testing of operation of said plurality of valves in situ in said assembly and comprising,
   a plurality of individually and selectively operable electrical switch means,
   second electrical connection means connected to said plurality of switch means and constructed for mating connection with said first electrical connection means such that said plurality of switch means are individually operatively connected to the solenoids of said valves,
   a first air pressure transducer constructed for selective individual connection to each said valve output and responsive to air pressure at such valve output for supplying an electrical signal indicative to such pressure,
   means connected to all of said switch means for providing first and second signals respectively indicative of activation and de-activation at one of said switch means,
   first threshold means connected to said first transducer for providing third and fourth signals respectively indicative of activation and de-activation air pressures at the value output,
   a first counter connected to receive said first and third signals for measuring time delay therebetween and thereby indicating turn-off operating time at said valve.

2. The apparatus set forth in claim 1 further comprising an oscillator providing a periodic time-base signal to both of said first and second counters.

3. The apparatus set forth in claim 2 further comprising digital display means connected to said first and second counters for displaying said operating times in milliseconds.

4. The apparatus set forth in claim 1 wherein said valve block assembly includes a plurality of air-operated air valves individually connected to outputs of selected ones of said solenoid-operated air valves, said manifold including means for supplying air under pressure to said air-operated valves, and means for individual connection to the output of each said air-operated valve, said apparatus further comprising
   a second air pressure transducer constructed for selective individual connection to each said air-operated valve output and responsive to air pressure at such output for supplying an electrical signal indicative of such pressure,
   second threshold means connected to said second transducer for providing fifth and sixth signals respectively indicative of activation and de-activation air pressures at the air-operated valve output,
   a third counter connected to receive said first and fifth signals for measuring time delay therebetween and thereby indicating combined turn-on operating time of the air-operated valve and its associated solenoid-operated valve, and
   fourth counter connected to receive said second and sixth signals for measuring time delay therebetween and thereby indicating combined turn-off operating time of the air-operated valve and its associated solenoid-operated valve.

5. The apparatus set forth in claim 4 further comprising a test stand having a mounting block for receiving said valve block assembly, said mounting block including means for simultaneously supplying air under pressure to all solenoid-operated and air-operated valves of a valve block assembly mounted thereon.

6. The apparatus set forth in claim 5 further comprising means constructed for selective individual connection through said mounting block to exhaust ports of said air-operated valves for measuring air leakage at such exhaust ports.

7. Apparatus for testing a valve block assembly for operating an individual section glass forming maching, said valve block assembly including a plurality of solenoid-operated air valves, a plurality of air-operated air valves individually connected to outputs of selected ones of said solenoid-operated air valves, a manifold including means for supplying input air under pressure to all of said valves and means for individual connection to the output of each said valve, and first electrical connection means individually operatively connected to solenoids of said solenoid-operated valves, said apparatus being constructed for individual qualitative testing of operation of each solenoid-operated and air-operated valve combination in situ in said assembly and comprising
   a plurality of individually and selectively operable electrical switch means,
   second electrical connection means connected to said plurality of switch means and constructed for mating connection with said first electrical connection means such that said plurality of switch means are individually operatively connected to the solenoids of said solenoid-operated valves, a first air pressure transducer constructed for selective individual connection to each said solenoid-operated valve output and responsive to air pressure at such output for supplying an electrical signal indicative of such pressure, a second air pressure transducer constructed for selective individual connection to each said air-operated valve output and responsive to air pressure at such output for supplying an electrical signal indicative of such pressure, means connected to all of said switch means for providing a first signal indicative of activation at one of said switch means, first threshold means connected to said first transducer for providing a second signal indicative of activation air pressure at the solenoid-operated valve output, a first counter connected to receive said first and second signals for measuring time delay therebetween and thereby indicating activation time delay at said solenoid-operated valve, second threshold means connected to said second transducer for providing a third signal indicative of activation air pressure at the air-operated valve output, and a second counter connected to receive said first and third signals for measuring time delay therebetween and thereby indicating combined activation time delay of the air-operated valve and its associated solenoid-operated valve.

8. The apparatus set forth in claim 7 further comprising means connected to all of said switch means for providing a fourth signal indicative of de-activation at said switch means, third threshold means connected to said first transducer for providing a fifth signal indicative of de-activation air pressure at the solenoid-operated valve output, a third counter connected to receive said fourth and fifth signals for measuring time delay therebetween and thereby indicating de-activation time delay at said solenoid-operated valve, fourth threshold means connected to said second transducer for providing a sixth signal indicative of deactivation air pressure at the air-operated valve output, and a fourth counter connected to receive said fourth and sixth signals for measuring time delay therebetween and thereby indicating combined de-activation time delay of the air-operated valve and its associated solenoid-operated valve.

* * * * *

UNITED STATES PATENT AND TRADEMARK OFFICE
CERTIFICATE OF CORRECTION

PATENT NO. : 4,615,722
DATED : October 7, 1986
INVENTOR(S) : Leonard D. Steffan and William L. McCoy It is certified that error appears in the above-indentified patent and that said Letters Patent is hereby corrected as shown below:

In claim 1, column 7, after line 68, add:

and a second counter connected to receive said second and fourth signals for measuring time delay therebetween and thereby indicating turn-off operating time at said valve.

Signed and Sealed this

Eighth Day of October, 1996

Attest:

BRUCE LEHMAN

Attesting Officer      Commissioner of Patents and Trademarks